United States Patent [19]
Mazur et al.

[11] Patent Number: 4,486,839
[45] Date of Patent: Dec. 4, 1984

[54] SYNCHRONOUS WHEEL-SLIP PROTECTION SYSTEM

[75] Inventors: Richard J. Mazur, Pittsburgh; James A. Wood, Versailles Boro, both of Pa.

[73] Assignee: American Standard Inc., Wilmerding, Pa.

[21] Appl. No.: 407,522

[22] Filed: Aug. 12, 1982

[51] Int. Cl.³ ................................................ B60T 8/08
[52] U.S. Cl. ...................... 364/426; 303/95; 303/96; 246/182 B; 246/182 C; 246/182 R
[58] Field of Search ............... 303/95, 96, 106; 246/182 B, 182 C, 182 R

[56] References Cited
U.S. PATENT DOCUMENTS

| | | | |
|---|---|---|---|
| 3,740,652 | 6/1973 | Burgener | 328/137 |
| 4,130,323 | 12/1978 | Rajput et al. | 303/106 |
| 4,161,717 | 7/1979 | Hoover et al. | 340/62 |
| 4,196,940 | 4/1980 | Jones | 303/105 |

Primary Examiner—J. V. Truhe
Assistant Examiner—Saul M. Bergmann
Attorney, Agent, or Firm—J. B. Sotak

[57] ABSTRACT

A synchronous wheel-slip control system for a multi-axle vehicle having a speed sensor for producing signals representative of the velocity of each of the wheel axle units. A differentiator connected to each of the speed sensors for differentiating the velocity signals to obtain rate signals. A plurality of truck and car rate comparators for determining when all the wheel axle units are in synchronism. A plurality of truck and car highest velocity circuits for determining the actual highest velocity signal of the wheel axle units and a car differentiator for differentiating the actual highest velocity signal to obtain the actual highest rate signal. A synchronous slip logic network for causing a data processing circuit to initiate a brake force reduction action of one of the trucks when all the wheel axle units are in synchronism and when the actual highest rate signal exceeds a requested rate.

10 Claims, 4 Drawing Figures

SYNCHRONOUS WHEEL-SLIP PROTECTION SYSTEM

FIELD OF THE INVENTION

This invention relates to a system for providing synchronous wheel-slip protection by single truck staging, and more particularly to a wheel-slip control system for sensing and detecting when all of the wheels of a railway car are synchronously slipping at substantially the same deceleration rate and for causing the release of the brakes on a selected one of the trucks to cause the velocity of the wheels of the selected truck to return to the speed of the vehicle.

BACKGROUND OF THE INVENTION

In certain types of transportation systems, such as in modern high speed railway and mass and/or rapid transit operations, there is a genuine need for providing an improved wheel-slip detection apparatus which will more safely and efficiently slow down and/or stop the transit vehicles or train at a station or the like. In one given application, it is an authoritative requirement that the wheel-slip controller must be capable of detecting synchronous wheel slip. The definition of synchronous wheel slip is a condition in which all the wheels of the vehicle are slipping at the same or substantially the same deceleration rate. A slip occurs when more braking force is exerted on any one or more wheel axle units than that which can be sustained by the available amount of frictional adhesion that exists between the wheels and the rails. The slipping condition causes the effected axle to decelerate at a higher rate than the vehicle deceleration. In practice, the previous types of wheel-slip control systems reduced the braking force on the slipping axle to a point where it is lower than the equivalent force of the available adhesion. This will stop the axle from decelerating faster than the vehicle and will cause the axle to accelerate back up to the speed of the vehicle. For example, during the time when an axle is decelerating faster than the speed of the vehicle, a velocity differential is developed between the slipping axle and the velocity of the vehicle. In the past, the velocity differential must exceed a predetermined value before any dumping of the brake pressure was initiated. In most cases, the rate of synchronous wheel-slip is less than the rate at which previous wheel-slip controllers take action so that the adverse condition would continue undetected. Thus, it is necessary to produce a condition which will cause the wheel-slip controlling apparatus to initiate corrective measures during synchronous wheel slip for bringing all the axles back to the true velocity of the vehicle.

OBJECTS OF THE INVENTION

Accordingly, it is an object of this invention to provide a new and improved wheel-slip control apparatus for detecting synchronous wheel slip.

A further object of this invention is to provide a unique synchronous wheel-slip control system.

Another object of this invention is to provide a novel wheel-slip control system which senses a synchronous wheel-slip control on all the wheel axle units of a vehicle and which initiates a single truck staging to bring the wheels back up to car speed.

Still another object of this invention is to provide a synchronous wheel-slip protection system comprising means for producing signals representative of the velocity of each of the wheels of a vehicle, means for differentiating the velocity signal to obtain rate signals, means for comparing the rate signals of each truck, means for comparing the truck rate signals of the vehicle, means for producing a signal representative of a desired rate of deceleration, means for determining the highest wheel velocity of the vehicle, means for differentiating the highest wheel velocity to obtain a highest wheel rate signal, means for comparing the highest wheel rate signal with the desired deceleration rate signal and for receiving an output from the truck rate comparing means, and means for initiating a brake force reduction action on one of the trucks of the vehicle when the highest wheel rate signal is greater than the desired deceleration rate signal and the output of the truck rate comparing means signifies that all of the wheel axle units are decelerating at substantially the same rate.

SUMMARY OF THE INVENTION

Briefly, in accordance with the present invention, there is provided a synchronous wheel-slip brake control system which initiates a brake force reduction on the wheel axle units of one truck of a multi-truck railway vehicle when all the wheels are slipping at the same deceleration rate and the actual deceleration rate of the highest velocity wheel axle unit is greater than the requested car deceleration rate but less than a normal wheel-slip threshold. A pulse generator for each wheel axle unit which produces signal pulses having a frequency proportional to the rotational speed of each of the wheel axle units of each truck. A velocity measuring circuit is connected to each of the pulse generators for producing velocity signals. A differentiator is connected to each of the velocity measuring circuits for changing the velocity signals into rate signals. A first truck comparator is connected to the differentiators of one truck and a second truck comparator is connected to the differentiators of another truck for comparing the rate signals of each truck and for producing output signals when the rate signals are substantially in agreement. A car rate comparator is connected to the truck rate comparators for comparing the output signals and for producing an output signal when the output signals are substantially in agreement. The output signal from the car rate comparator is fed to a first input of a synchronous slip logic circuit. A first truck highest velocity circuit connected to the velocity measuring circuit of the one truck and a second truck highest velocity circuit connected to the velocity measuring circuit of the other truck for producing velocity signals representative of the highest velocity of each truck. A car highest velocity circuit is connected to the truck highest velocity circuits for producing a velocity signal representative of the highest velocity signals. A car rate differentiator differentiates and changes the acting highest velocity signal to an actual highest rate signal which is fed to a second input of the synchronous slip logic circuit. A requested brake rate digital signal is fed to a rate trainline isolation circuit which is connected to a code recognition circuit. The code recognition circuit applies the requested digital rate signal to a third input of the synchronous slip logic circuit. The synchronous slip logic circuit is connected to a data processing circuit which controls a dual solenoid slip control valve to initiate a brake force reduction on the wheel axle units on one truck when all the wheel axle units are slip in synchronism and when the actual highest rate signal exceeds the requested analog rate signal.

BRIEF DESCRIPTION OF THE DRAWINGS

The above objects and other attendant features and advantages will be more readily appreciated as the subject invention becomes better understood by reference to the following detailed description when considered in conjunction with the accompanying drawings, wherein:

FIG. 1A is disposed to the left while FIG. 1B is disposed to the right, of a synchronous wheel-slip control system in accordance to the present invention.

DETAILED DESCRIPTION OF THE INVENTION

Figure 1A:
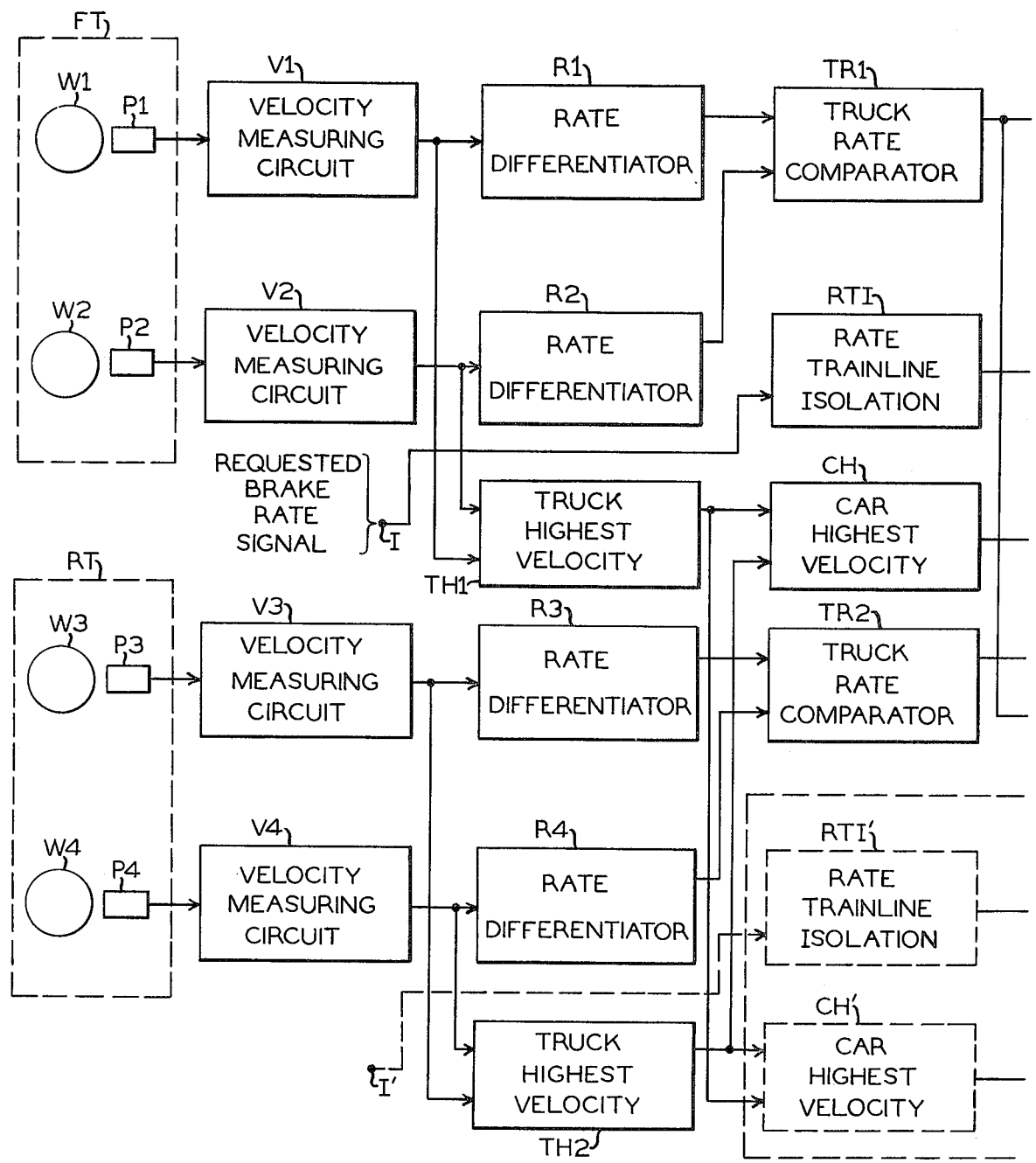
FIGS. 1A and 1B illustrate a schematic circuit block diagram which, when placed in side-by-side relationship, namely, when
Figure 1B:
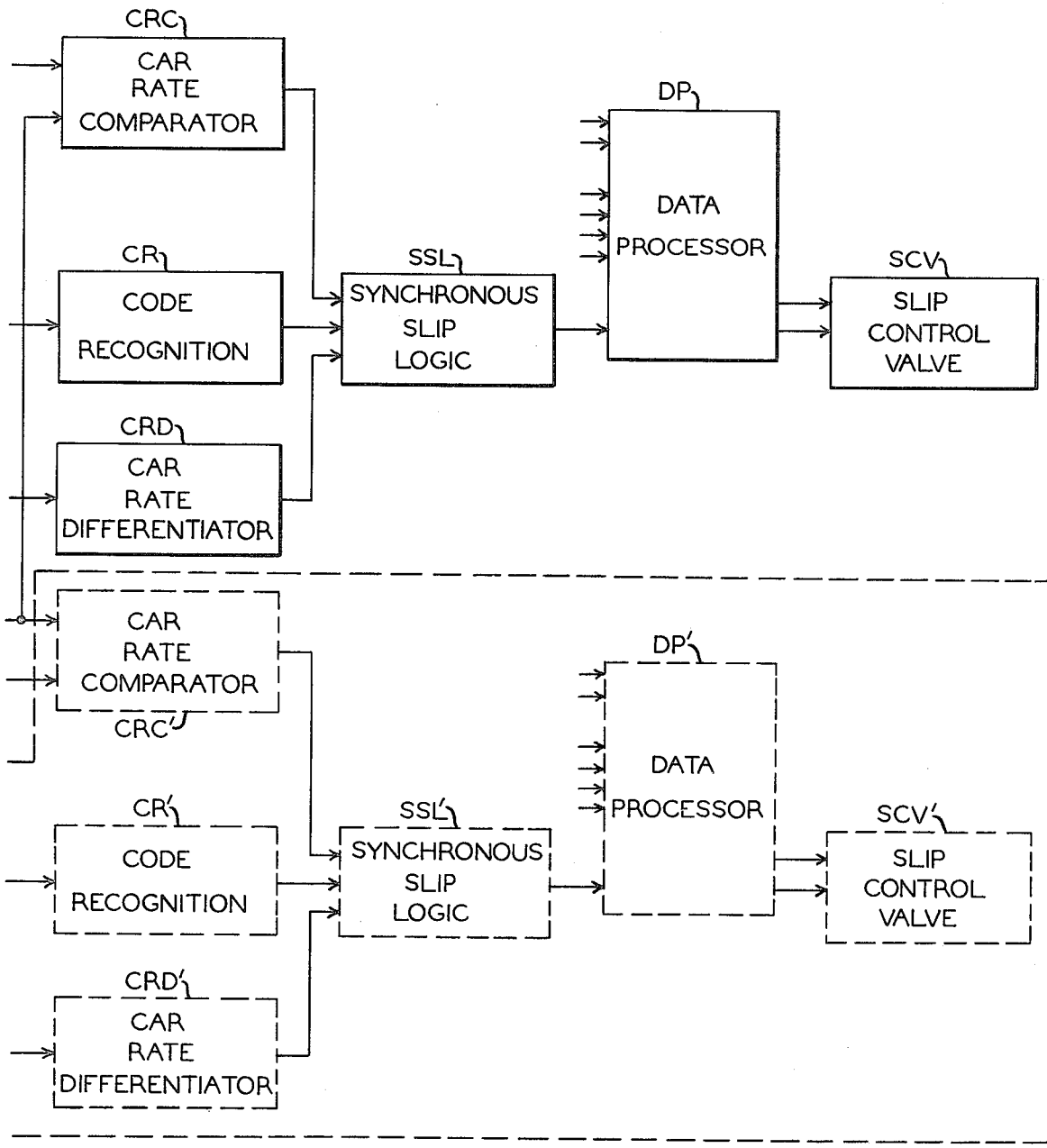

Referring now to the drawings, and in particular to FIGS. 1A and 1B, there is shown a front truck FT and a rear truck RT of a four-axle railway car or vehicle. The front truck FT includes a pair of wheel axle units W1 and W2 while the rear truck RT includes a pair of wheel axle units W3 and W4. The wheel axle units W1, W2, W3 and W4 have associated magnetic pickup devices P1, P2, P3 and P4, respectively, which may take the form of conventional tachometer generators. Each of the tachometer generators is disposed in close proximity to a toothed wheel which is driven by each of the wheel axle units. Thus, the magnetic generator senses the passing teeth of the driven gears to produce electrical signals or pulses which have a frequency proportional to the angular rotation of the respective gears. That is, the tachometer generators produce alternating current signals having a frequency which varies with the rotating speed or velocity of the respective wheel axle units. It will be seen that the output of each of the magnetic pickup devices P1, P2, P3 and P4 is connected to the input of an associated velocity measuring circuit V1, V2, V3 and V4, respectively. Each of the velocity measuring circuits is basically a converter which includes a pulse shaper, counters and buffer latches. It will be appreciated that a.c. signals are fed to the pulse shaper which produces constant-amplitude, square-wave pulses which have a repetition rate proportional to the input frequency. Next, the square-wave pulses are fed to a gating circuit which allows a high frequency clock input to the counters to produce an output which is inversely proportional to the frequency of the particular wheel axle unit being monitored. Then, the velocity count signals are fed to buffer latches which provide the necessary stabilization and isolation. As shown, the outputs of the velocity measuring circuits V1, V2, V3 and V4 are connected to the inputs of the respective rate differentiators R1, R2, R3 and R4, and the outputs of velocity measuring circuits V1 and V2 are connected to the inputs of truck highest velocity circuit TH1 while the outputs of velocity measuring circuits V3 and V4 are connected to the inputs of the truck highest velocity circuit TH2. The differentiating circuits operate in a wellknown manner to perform a time derivation for obtaining a rate signal having one polarity when the vehicle is decelerating and the opposite polarity when the vehicle is accelerating. Each of the truck highest velocity circuits TH1 and TH2 is simply a diode tree and operational amplifier auctioning circuit which senses and selects which output signal from either or both of the velocity measuring circuits V1 and V2 has the highest value. The output signals from the truck highest velocity circuits TH1 and TH2 are fed a car highest velocity circuit CH which selects the output signal from either or both of the circuits TH1 and TH2 which has the highest amplitude. The velocity output signal from the car highest velocity circuit CH is fed to the input of a car rate differentiating circuit CRD which performs a time derivation for obtaining an output substantially proportional to the rate of change of the input. The output from differentiator CRD is connected to one input of a synchronous slip logic circuit SSL which will be further described hereinafter.

Returning now to the rate differentiating circuits, it will be seen that the outputs of the rate differentiators R1 and R2 are connected to the inputs of truck rate comparison circuit TR1 while the outputs of the rate differentiators R3 and R4 are connected to the inputs of the truck rate comparison circuit TR2. Each of the outputs of the truck rate comparators TR1 and TR2 are connected to the two inputs of a car rate comparator CRC. As shown, the output of the comparator CRC is connected to another input of the synchronous slip logic circuit SSL.

It will be seen that the final or third input to the synchronous slip logic circuit SSL is coupled to a code recognition circuit CR which is fed by a rate trainline isolation circuit RTI. A requested brake rate signal is applied to terminal 1 which is connected to the input of the rate trainline isolation circuit which may include an optical diode and transistor amplifier to minimize the effects of noise and interference on the system. The rate signal may be automatically generated when the system is placed in a braking mode status and may be a voltage which is representative of, for example, −8 mphps miles per hour second (mphps). The code recognition circuit may be a digital-to-analog converter for providing a voltage to the third input of logic circuit SSL. The output of the logic circuit SSL is fed to the input of a data processor DP which is connected to a slip control valve SCV. The data processing apparatus DP may include a main logic portion having a plurality of logical gating inverting and amplifying circuits which receive and process the input data to cause a high or low output which is connected to the slip control valve SCV of the front truck FT. In practice, the slip control valve SCV of the front truck may take the form of a conventional solenoid electropneumatic dump valve which is capable of applying the pressure during braking, venting the pressure during brake release and holding the pressure during lapping operation.

In viewing FIGS. 1A and 1B, it will be seen that a duplicate set of apparatus is provided for the rear truck RT as indicated in the dashed lines. In the present instance, the front truck is selected to provide the single truck staging in order to determine whether synchronous wheel slip is occurring during a controlled braking mode of operation. Thus, if desired, the rate trainline isolation circuit RTI', the car highest velocity circuit CH', the code recognition circuit CR', the car rate differentiating circuit CRD', the synchronous slip logic circuit SSL', the data processing circuit DP' and the slip control valve SCV' of the rear truck RT may be used in place of the front truck apparatus to provide the single truck staging operation for determining a synchronous wheel slip condition on the railway vehicle.

Figure 2:
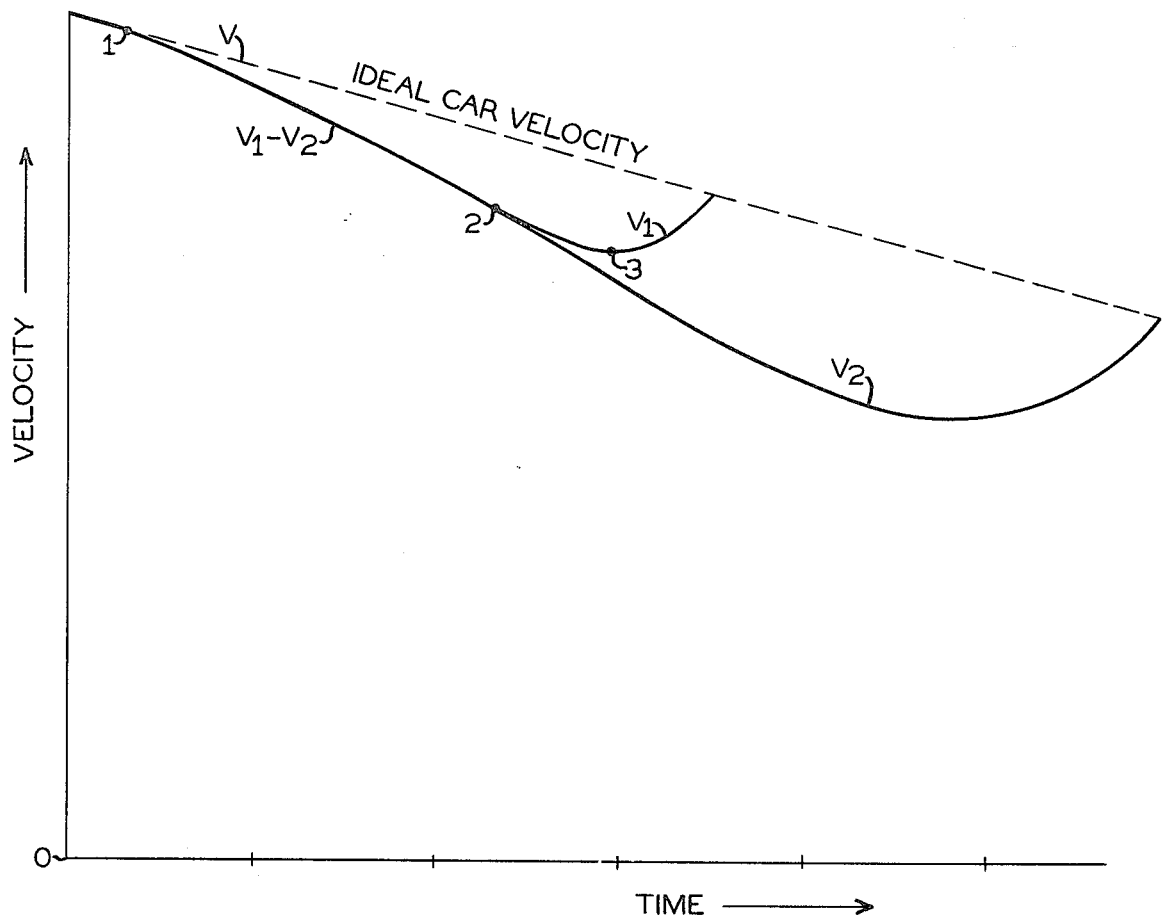
FIGS. 2 and 3 are graphical illustrations of the velocity and rate curves which will be of assistance in more readily understanding the operation of the synchronous wheelslip control system of FIGS. 1A and 1B.

In describing the operation, it will be assumed that the vehicle is in a braking mode and is decelerating so that the velocity of the vehicle is following the velocity curve as shown in FIG. 2. Thus, as soon as the brakes are applied, namely, a time zero (0), the velocity of the vehicle begins to decrease and under ideal conditions the vehicle will follow the linear velocity curve V which is shown by the partially solid and dashed line. It will be noted that if the vehicle continues to decelerate at a uniform speed, the car rate will remain constant as shown by the solid and dashed line curve RCR in FIG. 3.

Figure 3:
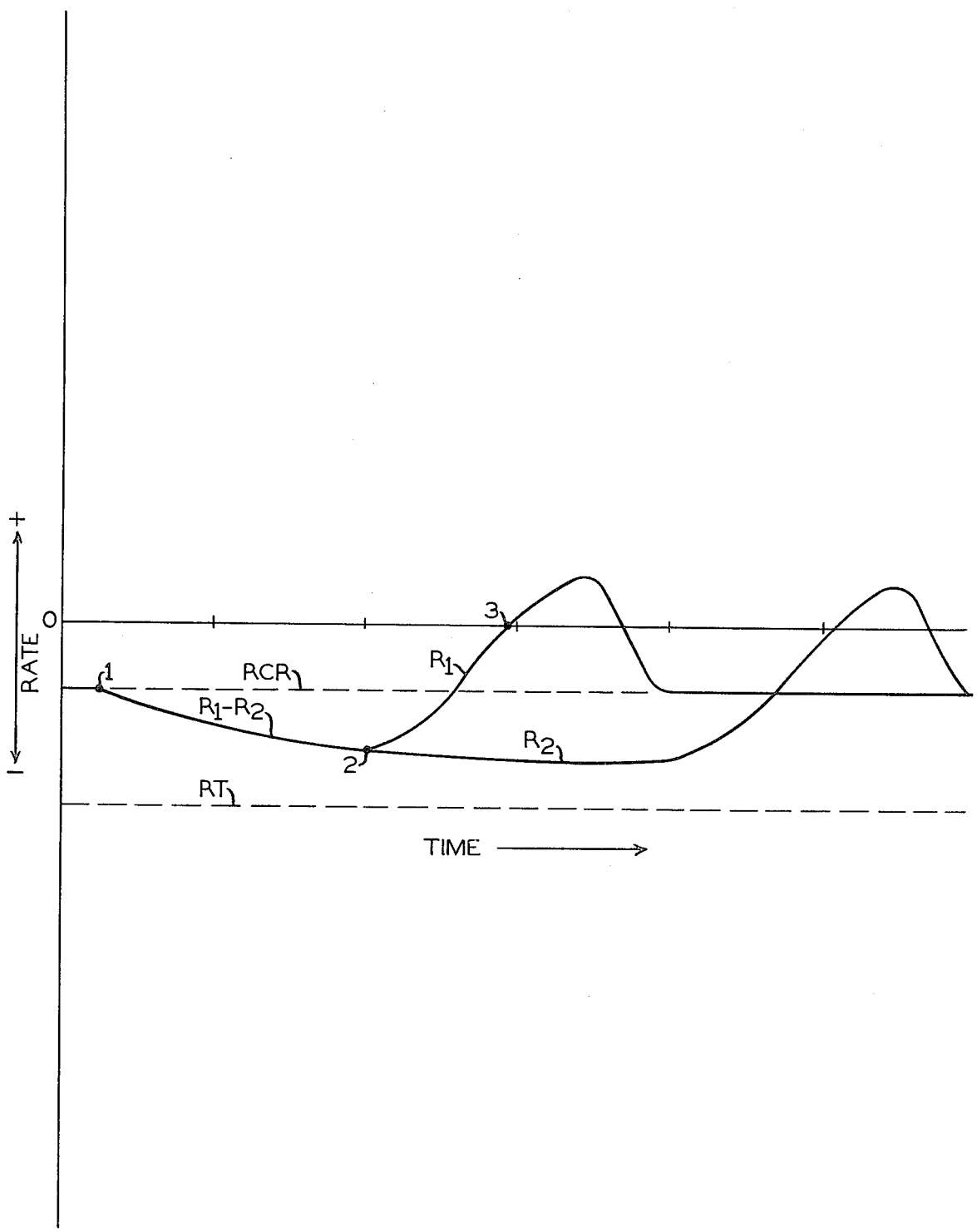

However, let us assume that a synchronous wheel slip begins to occur at point 1 of the curves of FIGS. 2 and 3, namely, that the braking force on all four wheel axle units of both trucks is greater than the available adhesion which exists between the wheels and the rails. Further, it is assumed that the degree of synchronous wheel slip lies within a range which is less than the rate trip signified by the band between the requested car rate curve RCR and the rate trip curve RT of FIG. 3 Thus, the synchronous wheel-slip condition occurs on both trucks and their velocities deviate from the linear velocity curve V and begin to follow the curve $V_1$-$V_2$ where $V_1$ represents the speed of the front truck and $V_2$ represents the velocity of the rear truck. In viewing the curves of FIGS. 2 and 3, it will be observed that as the axle velocities decelerate faster than the vehicle velocity, the deceleration rates of the trucks begin to change in the negative direction but remain above the trip rate level and within the differential band of the rate curves RCR and RT. Now if the car rate comparator CRC receives two inputs which are equal or within a given range, this will indicate or signify that all four axles are rotating at substantially the same speed. Thus, the comparator CRC supplies a signal to the input of the synchronous slip logic circuit SSL. Now if the output of the car rate differentiator CRD is larger than the output of the requested code recognition circuit CR, then the synchronous slip logic circuit SSL produces an output which is processed by the data processor DP to cause the energization of the slip control valve SCV so that pressure in the brake line for the front truck FT is vented. The venting of the brake line to atmosphere causes the release of the brakes in both wheel axle units W1 and W2 of the front truck FT. The brake reduction causes the deceleration rate of the axle units W1 and W2 to slow up so that the velocity $V_1$ of the wheels tends to deviate from velocity $V_2$ of axle units W3 and W4 as shown at point 2 of FIG. 2. At the same time, the rate $R_1$ begins to increase as shown at point 2 of FIG. 3. After a slight delay, the velocity of the wheels on units W1 and W2 will begin to regain speed and will begin to return to the ideal car velocity as shown by point 3 in FIG. 2. That is, in viewing FIG. 3, it will be seen that when the deceleration rate is zero at point 3, the velocity of the axle units W1 and W2 will begin to increase back up to the vehicle velocity. Approximately at this time the output signal from the truck rate comparator TR1 deviates sufficiently from that of truck rate comparator TR2, namely, the differential input voltages to car rate comparator CRC exceeds the voltage range between CR and RT, so that the input signal to the first input of the synchronous slip logic circuit SSL is removed. Thus, the synchronous slip logic circuit SSL no longer supplies the data processor DP, and the wheel axle units W1 and W2 of the front truck will initially be brought up to the vehicle velocity and then the wheel axle units of the rear truck will subsequently be brought up to the velocity of the vehicle whereupon the braking effort is effectively reinstituted on all of the wheel axle units so that the vehicle may be efficiently and safely brought under a controlled braking and/or stopping at a station or the like.

It will be understood that various alterations and changes may be made by those skilled in the art without departing from the spirit and scope of the subject invention. Further, with the advent of microprocessors and minicomputers, it is evident that the various functions and operations may be carried out and processed by a suitably programmed computer which receives the different inputs and produces the appropriate output. Therefore, it will be appreciated that certain modifications, ramifications, and equivalents will be readily apparent to persons skilled in the art, and accordingly, it is understood that the present invention should not be limited to the exact embodiment shown and described, but should be accorded the full scope and protection of the appended claims.

Having now described the invention, what we claim as new and desire to secure by Letters Patent, is:

1. A synchronous wheel-slip protection system comprising, means for producing signals representative of the velocity of each of the wheel axle units of each truck of a vehicle, means for differentiating the velocity signals to obtain rate signals, one means for comparing the rate signals of each truck, another means for comparing the truck rate signals of the vehicle, means for producing a signal representative of the desired rate of deceleration, means for determining a highest wheel velocity of the vehicle, means for differentiating the highest wheel velocity to obtain a highest wheel rate signal, means for comparing the highest wheel axle signal with the desired deceleration rate signal and for receiving an output from said other truck rate comparing means, and means for initiating a brake force reduction action on the wheel axle units of one of the trucks of the vehicle when the highest wheel rate signal is greater than the desired deceleration rate signal and the output of said other truck rate comparing means signifies that all of the wheel axle units of the vehicle are decelerating at substantially the same rate.

2. The synchronous wheel-slip protection system as defined in claim 1, wherein said initiating means includes a data processor which controls a brake control valve.

3. The synchronous wheel-slip protection system as defined in claim 2, wherein said brake control valve includes a dual solenoid intake and exhaust valve.

4. The synchronous wheel-slip protection system as defined in claim 1, wherein said velocity producing means includes a signal frequency generator and a frequency-to-voltage converter.

5. The synchronous wheel-slip protection system as defined in claim 1, wherein said highest wheel vehicle determining means includes a pair of truck highest velocity circuits and a car highest velocity circuit.

6. The synchronous wheel-slip protection system as defined in claim 1, wherein said means for comparing the highest wheel rate signal with the desired deceleration rate signal is a synchronous slip logic network.

7. The synchronous wheel-slip protection system as defined in claim 6, wherein a code recognition circuit supplies the desired deceleration rate signal to said synchronous slip logic network.

8. The synchronous wheel-slip protection system as defined in claim 7, wherein said code recognition circuit includes a digital-to-analog converter.

9. The synchronous wheel-slip protection system as defined in claim 1, wherein said highest wheel velocity means is connected to a wheel rate differentiator which differentiates the highest wheel velocity to the highest wheel rate signal.

10. The synchronous wheel-slip protection system as defined in claim 1, said vehicle includes two trucks having two wheel axle units on each truck.

* * * * *